(12) United States Patent
Yamaguchi et al.

(10) Patent No.: US 11,427,260 B2
(45) Date of Patent: Aug. 30, 2022

(54) REINFORCEMENT AND REINFORCEMENT MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Housei Mizuno, Mie (JP); Shinya Sadohara, Mie (JP); Hiroki Hirai, Mie (JP); Shinya Itou, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 325 days.

(21) Appl. No.: 16/638,246

(22) PCT Filed: Jun. 29, 2018

(86) PCT No.: PCT/JP2018/024829
§ 371 (c)(1),
(2) Date: Feb. 11, 2020

(87) PCT Pub. No.: WO2019/039086
PCT Pub. Date: Feb. 28, 2019

(65) Prior Publication Data
US 2020/0164924 A1    May 28, 2020

(30) Foreign Application Priority Data
Aug. 25, 2017 (JP) .............................. JP2017-162337

(51) Int. Cl.
*B62D 25/14* (2006.01)
*B60R 16/02* (2006.01)

(52) U.S. Cl.
CPC ........ *B62D 25/145* (2013.01); *B60R 16/0215* (2013.01)

(58) Field of Classification Search
CPC .......................... B62D 25/145; B60R 16/0215
See application file for complete search history.

(56) References Cited

U.S. PATENT DOCUMENTS

| 6,685,259 | B1  | 2/2004 | Shimase et al. |
| 2001/0003404 | A1 * | 6/2001 | Shikata ............... B60R 16/0207 307/10.1 |

(Continued)

FOREIGN PATENT DOCUMENTS

| CN | 1374913 | 10/2002 |
| CN | 106132672 | 11/2016 |

(Continued)

OTHER PUBLICATIONS

International Search Report issued in International Patent Application No. PCT/JP2018/024829, dated Sep. 11, 2018.

(Continued)

*Primary Examiner* — Lori L Lyjak
(74) *Attorney, Agent, or Firm* — Greenblum & Bernstein, P.L.C.

(57) ABSTRACT

A reinforcement is formed into an elongated shape, and includes a reinforcement body in which a housing part opened toward an outer peripheral side is formed and a covering part attached to close an opening of the housing part. A module component which is an electrical component or a wiring component may be housed in the reinforcement while being attached to the covering part.

6 Claims, 3 Drawing Sheets

(56) References Cited

U.S. PATENT DOCUMENTS

| | | | |
|---|---|---|---|
| 2002/0145309 A1* | 10/2002 | Shikata | B60H 1/242 |
| | | | 296/70 |
| 2003/0094831 A1 | 5/2003 | Kondo et al. | |
| 2017/0030079 A1 | 2/2017 | Ishikawa | |
| 2017/0210309 A1 | 7/2017 | Tsunoda et al. | |
| 2018/0123301 A1* | 5/2018 | Tsukamoto | H01R 13/111 |

FOREIGN PATENT DOCUMENTS

| | | | | |
|---|---|---|---|---|
| CN | 106985769 | 7/2017 | | |
| GB | 2 382 058 | 5/2003 | | |
| JP | 3-128572 | 12/1991 | | |
| JP | 2001-321845 | 11/2001 | | |
| JP | 2002-2540 | 1/2002 | | |
| JP | 2003-154874 | 5/2003 | | |
| JP | 2004-161136 | 6/2004 | | |
| JP | 2006-069480 | 3/2006 | | |
| WO | WO-2014050232 A1 * | 4/2014 | | B60R 16/0215 |
| WO | WO-2015186837 A1 * | 12/2015 | | B60R 16/0215 |

OTHER PUBLICATIONS

International Preliminary Report on Patentability issued in International Patent Application No. PCT/JP2018/024829, dated Feb. 25, 2020.

Japanese Office Action, Japanese Patent Office, Application No. 2017-162337, dated May 26, 2020, English translation.

Official Action / Search Report issued in counterpart Chinese Patent Application No. 201880050947.X, dated Sep. 3, 2021 (with English translation).

* cited by examiner

REINFORCEMENT AND REINFORCEMENT MODULE

TECHNICAL FIELD

The present invention relates a reinforcement incorporated into an inner side of a installment panel of a vehicle, for example, as a reinforcement member.

BACKGROUND ART

Patent Document 1 discloses a technique of inflating a tube stock, inside of which is partitioned with a wall part crossing in a radial direction, by hydroforming to form a reinforcement member having a desired external shape.

Patent Document 2 discloses that a wire harness is wired along a base portion of a reinforcement formed into an H-shape in cross section and an ECU is attached to the reinforcement, for example.

PRIOR ART DOCUMENTS

Patent Documents

Patent Document 1: Japanese Patent Application Laid-Open No. 2001-321845
Patent Document 2: Japanese Patent Application Laid-Open No. 2003-154874

SUMMARY

Problem to be Solved by the Invention

Reduction in a space occupied by an installment panel is required to increase an indoor space.

However, a wire harness and various components such as an ECU (electronic control unit) incorporated into an installment panel cause an inhibition of a downsizing of the installment panel.

On this point, according to Patent Document 2, the wire harness is wired along the base portion of the reinforcement formed into the H-shape in cross section, thus the this configuration contributes to a downsizing of the installment panel. However, the reinforcement has a shape that an outer periphery thereof is opened, thus strength needs to be taken into consideration.

In the meanwhile, according to the reinforcement having a closed shape in cross section described in Patent Document 1, it is hard to incorporate a component such as a wire harness into the reinforcement.

Thus, an object of the present invention is to easily secure strength of a reinforcement and efficiently use an inner space of the reinforcement.

Means to Solve the Problem

In order to solve the above problem, a reinforcement according to a first aspect includes: a reinforcement body formed into an elongated shape and including a housing part which is opened toward an outer peripheral side; and a covering part attached to close an opening of the housing part.

The reinforcement module according to a second aspect includes the reinforcement according to the first aspect, and a module component which is an electrical component or a wiring component, and housed in the reinforcement while being attached to the covering part.

A third aspect is the reinforcement module according to the second aspect, wherein the reinforcement body includes a first housing part and a second housing part opened toward an outer peripheral side in different positions as the housing part, the first housing part and the second housing part are partitioned in the reinforcement body, the reinforcement body includes, as the covering part, a first covering part attached to close an opening of the first housing part and a second covering part attached to close an opening of the second housing part, and the module component includes a power supply module component housed in one of the first housing part and the second housing part and a signal module component housed in another one of the first housing part and the second housing part.

A fourth aspect is the reinforcement module according to the second aspect, wherein the reinforcement body includes a first housing part and a second housing part opened toward an outer peripheral side in different positions as the housing part, the first housing part and the second housing part are partitioned in the reinforcement body, the reinforcement body includes, as the covering part, a first covering part attached to close an opening of the first housing part and a second covering part attached to close an opening of the second housing part, and the module component includes a wiring component housed in one of the first housing part and the second housing part and an electrical component housed in another one of the first housing part and the second housing part.

A fifth aspect is the reinforcement module according to any one of the second to fourth aspects, including a power supply line as the module component, wherein the power supply line is housed in the reinforcement while being in contact with at least one of the reinforcement body and the covering part.

A sixth aspect is the reinforcement module according to the fifth aspect, wherein the reinforcement module comprises a plurality of the power supply line, at least some of the power supply lines is fixed to the covering part via an elastic member, and the elastic member presses the at least some of the power supply lines to an inner surface of the housing part in a state where the covering part is attached to the opening of the housing part.

Effects of the Invention

According to the first aspect, the housing part is opened toward the outer peripheral side and the covering part is attached to close the opening, thus strength of the reinforcement can be easily secured and an inner space of the reinforcement is efficiently used.

According to the second embodiment, the module component which is the electrical component or the wiring component is housed in the reinforcement while being attached to the covering part. Thus, the module component can be easily housed in the reinforcement.

According to the third embodiment, the module component includes a power supply module component housed in one of the first housing part and the second housing part and a signal module component housed in another one of the first housing part and the second housing part, thus noise can be easily shielded between the power supply module component and the signal module component.

According to the fourth embodiment, the wiring component housed in one of the first housing part and the second housing part can be disposed in the reinforcement without being hindered by the electrical component housed in the other one of the first housing part and the second housing part.

According to the fifth embodiment, heat of the power supply line can be easily radiated via the reinforcement body or the covering part.

According to the sixth embodiment, the elastic member presses the at least some of the power supply lines to the inner surface of the housing part in the state where the covering part is attached to the opening of the housing part, thus heat radiation via the reinforcement body can be easily performed.

DESCRIPTION OF EMBODIMENT(S)

Figure 1:
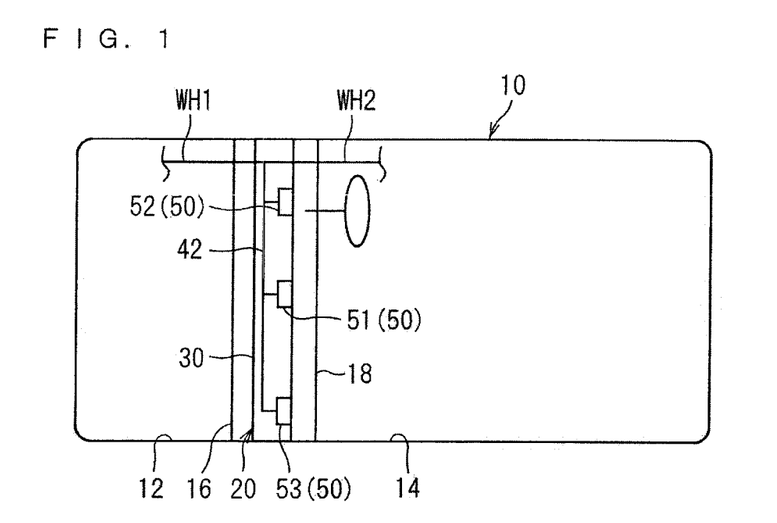
FIG. 1 A schematic view illustrating a reinforcement incorporated into a vehicle and a reinforcement module.

A reinforcement and a reinforcement module according to embodiments are described hereinafter. FIG. 1 is a schematic view illustrating a reinforcement 30 and a reinforcement module 20 incorporated into a vehicle 10.

The reinforcement 30 is a strength reinforcement member formed of metal, for example, and formed into an elongated shape. Both end portions of the reinforcement 30 are fixed to a metal body in the vehicle 10 by welding or using a screw, for example.

More specifically, the vehicle 10 includes a first room 12 in a front part of the vehicle and a second room 14 in a middle part of the vehicle in a front-back direction. When the vehicle 10 is assumed to be an internal combustion engine vehicle, the first room 12 is an engine room storing an engine, for example. When the vehicle 10 is assumed to be an electrical vehicle, the first room 12 is a room storing a battery and drive motor, for example. The second room 14 is a passenger compartment where a passenger rides. A partition wall 16 partitioning the first room 12 and the second room 14 is provided in the vehicle 10. The reinforcement 30 is located on the second room 14 side in relation to the partition wall 16. An upper side of the reinforcement 30 and an inner side of the second room 14 are covered by an installment panel 18 (refer to FIG. 2).

A wire harness WH1 as a wiring component connected to various electrical components such as an ECU (electronic control unit), a sensor, and a battery in the first room 12 passes through the partition wall 16 and is lead to an inner side of the installment panel 18. A wire harness WH2 as a wiring component connected to various electrical components such as a light in the second room 14 is lead to a front side of the second room 14, and then lead to the inner side of the installment panel 18.

ECUs (electronic control unit) 51 and 52 and a battery 53, for example, are provided in the inner side of the installment panel 18. A meter unit, for example, is incorporated into the installment panel 18 itself. The wire harnesses WH1 and WH2 described above are lead to the inner side of the installment panel 18, and connected to the ECUs (electronic control unit) 51 and 52, the battery 53, and the meter unit described above via a wire harness 42 which is a wiring component located on an inner side of the installment panel 18.

The reinforcement 30 is provided on the inner side of the installment panel 18, thus when the wire harness 42 provided on the inner side of the installment panel 18 is disposed along a width direction of the vehicle 10, the wire harness 42 is disposed along the reinforcement 30.

When a case of locating the wire harness 42 around the reinforcement 30 is assumed, a space for locating the wire harness 42, for example, needs to be provided between the reinforcement 30 and the installment panel 18. A position of an upper surface height of the installment panel 18 needs to be set higher for the space, and a partition of the installment panel 18 on a side of the second room 14 needs to be extended to a large degree to the side of the second room 14.

In the present embodiment, the following configuration is adopted as the reinforcement 30, thus an inner space of the reinforcement 30 is efficiently used, and strength of the reinforcement can be easily secured.

Figure 2:
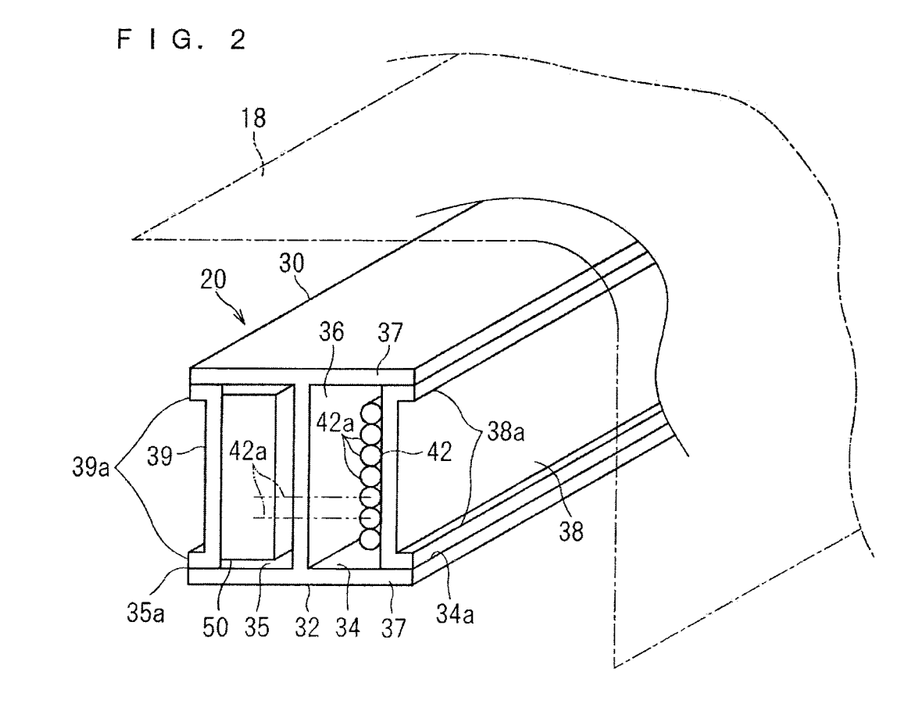
FIG. 2 A schematic perspective view illustrating a reinforcement module.
Figure 3:
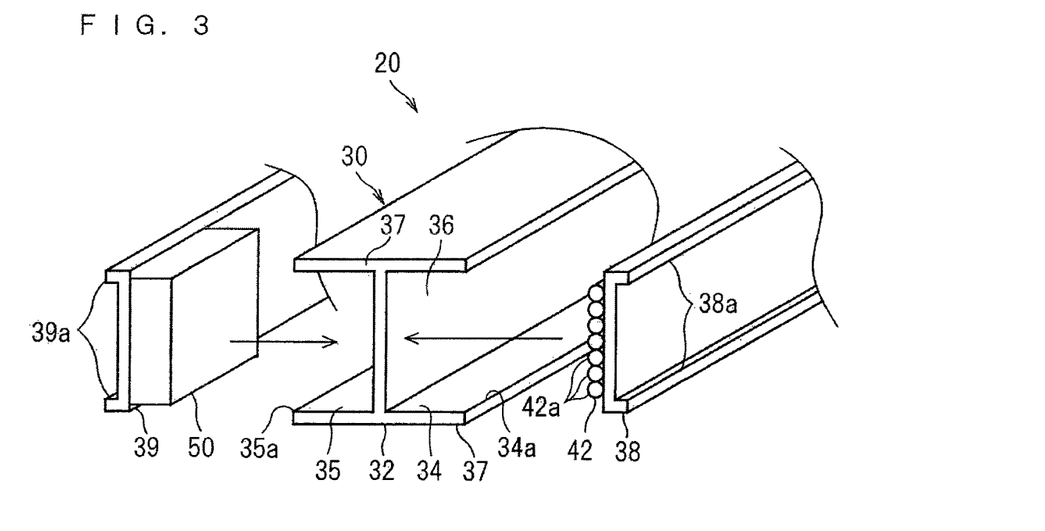
FIG. 3 A schematic exploded perspective view illustrating the reinforcement module.

FIG. 2 is a schematic perspective view illustrating the reinforcement module 20, and FIG. 3 is a schematic exploded perspective view illustrating the reinforcement module 20.

The reinforcement module 20 includes the reinforcement 30 and the wire harness 42 and an electrical component 50 as module components.

The reinforcement 30 includes a reinforcement body 32 and covering parts 38 and 39.

The reinforcement body 32 is a member formed of metal, for example, and formed into an elongated shape. Both end portions of the reinforcement body 32 are fixed to a metal body by welding or using a screw, for example. Housing parts 34 and 35 opened toward the outer peripheral side are formed in the reinforcement body 32.

Herein, the reinforcement body 32 includes a first housing part 34 and a second housing part 35 opened toward the outer peripheral side in different positions. The first housing part 34 and the second housing part 35 are partitioned by a partition 36 in the reinforcement body 32.

More specifically, the reinforcement body 32 includes the partition 36 and a pair of sidewall parts 37. The partition 36 is formed into an elongated plate-like shape. The pair of sidewall parts 37 is also formed into an elongated plate-like shape. The pair of sidewall parts 37 is sequentially formed in a posture parallel to each other on both sides of the partition 36 to protrude toward both surface sides of the partition 36. Thus, the reinforcement body 32 is formed into an H-shape in a cross section (a section in a surface orthogonal to an extension direction).

A portion surrounded by one side of the pair of sidewall parts 37 and the partition 36 is the first housing part 34. The first housing part 34 is opened between one side edges of the pair of sidewall parts 37 on an opposite side of the partition 36.

A portion surrounded by the other side of the pair of sidewall parts 37 and the partition 36 is the second housing part 35. The second housing part 35 is opened between the other side edges of the pair of sidewall parts 37 on an opposite side of the partition 36.

The first housing part 34 the second housing part 35 described above are opened to the sides opposite to each other.

The first covering part 38 is attached to the reinforcement body 32 to close an opening 34a of the first housing part 34. More specifically, the first covering part 38 is an elongated plate-like member formed of metal, for example. Herein, the first covering part 38 is formed into a rectangular plate-like shape corresponding to the opening 34a of the first housing part 34. A pair of side edge parts 38a bended vertically to a central portion of the first covering part 38 in a width direction are formed on both sides of the first covering part 38. The first covering part 38 is attached to the reinforcement body 32 so that outward surfaces of the pair of side edge parts 38a come in contact with inner surfaces of the one side edges of the pair of sidewall parts 37 and the first covering part 38 closes the opening 34a of the first housing part 34.

The second covering part 39 is attached to the reinforcement body 32 to close an opening 35a of the second housing part 35. More specifically, the second covering part 39 is an elongated plate-like member formed of metal, for example. Herein, the second covering part 39 is formed into a rectangular plate-like shape corresponding to the opening 35a of the second housing part 35. A pair of side edge parts 39a bended vertically to a central portion of the second covering part 39 in a width direction are formed on both sides of the second covering part 39. The second covering part 39 is attached to the reinforcement body 32 so that outward surfaces of the pair of side edge parts 39a come in contact with inner surfaces of the other side edges of the pair of sidewall parts 37 and the second covering part 39 closes the opening 35a of the second housing part 35.

It is preferable that the first covering part 38 and the second covering part 39 are welded or screwed to the reinforcement body 32 so as to be attached thereto in a state of not being separable from the reinforcement body 32.

Herein, the reinforcement 30 is linearly formed, but may be curved halfway through. Herein, the first housing part 34 and the second housing part 35 are opened over the whole reinforcement body 32 in the extension direction, however, this configuration is not necessary. The housing part may be formed to be partially opened in the reinforcement body in the extension direction.

The first housing part 34 and the second housing part 35 are opened toward the outer peripheral side in the reinforcement 30 described above, thus the inner space of the first housing part 34 and the second housing part 35 which is the inner space of the reinforcement 30 can be efficiently used as a storage space for the other component, for example. The first covering part 38 and the second covering part 39 are attached to close the opening 34a of the first housing part 34 and the opening 35a of the second housing part 35, thus the reinforcement 30 is formed into a tubular shape as a final form. Thus, the strength of the reinforcement 30 can be easily secured.

As an example of using the inner space of the reinforcement 30, a module component, which is attached to the first covering part 38 or the second covering part 39, is housed in the reinforcement 30.

The module component is an electrical component or a wiring component.

Assumed as an example of the electrical component 50 are the ECUs 51 and 52 performing a control of load and communication and the battery 53 which is an electrical power supply component, for example. The electrical component is collectively referred to as the electrical component 50 when there is no need to distinguish the electrical component in the following description and drawings, and is distinguished as the ECU 51, the ECU 52, or the battery 53 as necessary.

The electrical component 50 described above is fixed to a surface of the second covering part 39 facing a side of the second housing part 35. The electrical component 50 can be fixed to the second covering part 39 by a screw, an fitting structure, a double-sided tape, or an adhesive agent, for example.

Each electrical component 50 is formed in a size being able to be housed in the second housing part 35, thus when the opening 35a of the second housing part 35 is closed with the second covering part 39, each electrical component 50 is housed in the second housing part 35.

Assumed as the wiring component is the wire harness 42 connecting the electrical components 50 described above to each other or connecting the electrical component 50 to the other electrical component in the first room 12 or the second room 14. Herein, the wire harness 42 is made up of a plurality of electrical wires 42a in which a resin is extrusion-coated around a core wire. The plurality of electrical wires 42a include at least one of a signal line and a power supply line. Herein, the plurality of electrical wires 42a include both the signal line and the power supply line.

The plurality of electrical wires 42a are parallelly fixed to a surface of the first covering part 38 facing a side of the first housing part 34 along an extension direction of the first covering part 38. Each electrical wire 42a can be fixed to the first covering part 38 by ultrasonic welding, a double-sided tape, or an adhesive agent, for example. The plurality of electrical wires 42a are in contact with the first covering part 38. The state where the electrical wire 42a is in contact with the first covering part 38 includes a case where the electrical wire 42a is in direct contact with the first covering part 38 and a case where the electrical wire 42a is in contact with the first covering part 38 with a fixing member such as a double-sided tape or an adhesive agent therebetween, for example.

The wire harness may be made up with a plurality of electrical wires fixed to a sheet material such as a cloth or a resin sheet by ultrasonic welding or a thread, for example, or a plurality of conductive wires parallelly sandwiched between resin sheets, for example. The plurality of electrical wires or conductive wires may be provided to be stacked in a plurality of layers on the first covering part.

One end portions of the plurality of electrical wires 42a described above extend from the reinforcement 30, and are connected to the wire harnesses WH1 and WH2 via a connector, for example.

The plurality of electrical wires 42a are appropriately branched in a middle portion of the reinforcement 30 in the extension direction, and are connected to the electrical component 50. The electrical wire 42a extending from the first housing part 34 toward the second housing part 35 may be disposed to pass through the partition 36 (refer to alternate long and two short dashes line in FIG. 2), or may also be disposed to pass through the first covering part 38 and the second covering part 39 and go through an outer periphery of the reinforcement 30.

There is also a case where the plurality of electrical wires 42a are appropriately branched in the middle portion of the reinforcement 30 in the extension direction, pass through the reinforcement body 32 or the first covering part 38, and are lead outside the reinforcement 30, thereby being connected to an electrical component incorporated into the installment panel 18, for example, a meter unit.

The reinforcement body 32, the first covering part 38, and the second covering part 39 separated from each other are prepared in assembling the reinforcement 30.

Then, the plurality of electrical wires 42a are fixed to the first covering part 38. The electrical component 50 is fixed to the second covering part 39. Subsequently, the first covering part 38 is attached to the reinforcement body 32 to close the opening 34a of the first housing part 34. Accordingly, the wire harness 42 including the plurality of electrical wires 42a is housed in the first housing part 34. Before or after the above processing, the second covering part 39 is attached to the reinforcement body 32 to close the opening 35a of the second housing part 35. Accordingly, the electrical component 50 is housed in the second housing part 35 (refer to FIG. 3).

It is also applicable that the electrical component 50 is fixed to the first covering part 38, the plurality of electrical wires 42a are fixed to the second covering part 39, the wire harness 42 including the plurality of electrical wires 42a is housed in the second housing part 35, and the electrical component 50 is housed in the first housing part 34.

According to the reinforcement 30 and the reinforcement module 20 having the configurations described above, the first housing part 34 and the second housing part 35 are opened toward the outer peripheral side in the reinforcement body 32, and the first covering part 38 and the second covering part 39 are attached to the reinforcement body 32 to close these openings 34a and 35a. Thus, the strength of the reinforcement 30 can be easily secured. The inner space of the reinforcement 30 can be efficiently used.

The module component which is the electrical component 50 or the wiring component may be attached to the reinforcement body 32 or may also be attached to the first covering part 38 or the second covering part 39.

When the module component which is the electrical component 50 or the wiring component is housed in the reinforcement 30 while being attached to the first covering part 38 or the second covering part 39, the module component can be easily housed in the reinforcement 30. The reason is that an operation of attaching the module component can be performed on a planar portion of the first covering part 38 or the second covering part 39 more easily than on a portion in a concave space.

The module component includes the wire harness 42 which is the wiring component and the electrical component 50 such as the ECUs 51 and 52 and the battery 53, the wire harness 42 is housed in one of the first housing part 34 and the second housing part 35, and the electrical component 50 is housed in the other one of the first housing part 34 and the second housing part 35. Thus, the wire harness 42 can be disposed in the reinforcement 30 without being hindered by the electrical component 50. For example, the operation of fixing the electrical wire 42a along the main surface of the first covering part 38 can be performed without being hindered by the electrical component 50, thus automation, for example, can be easily performed. The ECUs 51 and 52 are disposed in the reinforcement 30, thus the ECUs 51 and 52 can be disposed in a position where a hand of a user can hardly reach.

It is preferable that all of the electrical wires 42a are housed in one of the first housing part 34 and the second housing part 35, and all of the electrical components 50 are housed in the other one of the first housing part 34 and the second housing part 35, however, this configuration is not necessary. The reason is that the operation of wiring the electrical wire 42a can be performed without being hindered by the following electrical component 50 as long as at least one electrical component 50 is housed in the housing part different from that where the electrical wire 42a is housed. Thus, some electrical components 50 may be housed in the same housing part as that where the electrical wire 42a is housed.

The power supply line included in the plurality of electrical wires 42a is in contact with the first covering part 38, thus heat of the power supply line can be radiated via the first covering part 38.

MODIFICATION EXAMPLE

Various modification examples are described based on a premise of the embodiment described above.

Figure 4:
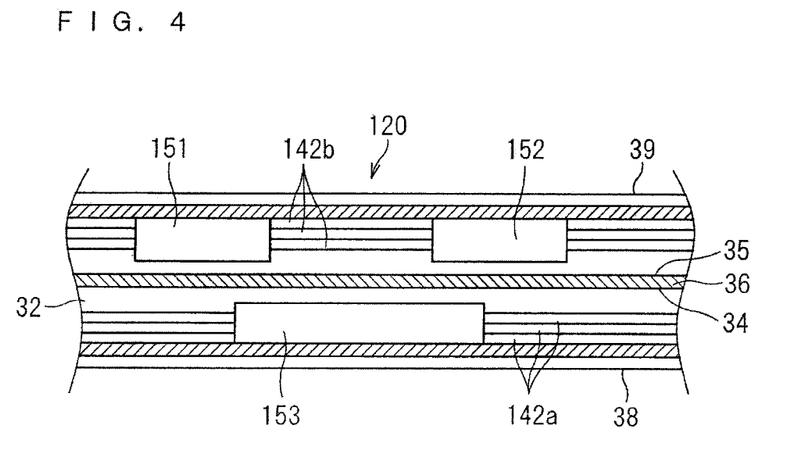
FIG. 4 A schematic cross-sectional view illustrating a reinforcement module according to a first modification example.

In a reinforcement module 120 according to a first modification example illustrated in FIG. 4, the module component includes a power supply module component and a signal module component.

The power supply module component is at least one of a battery 153, a power supply control unit, and a power supply line 142a, for example.

The signal module component is at least one of ECUs 151 and 152 and a signal line 142b, for example.

The battery 153 and the power supply line 142a which are the power supply module components are housed in one of the first housing part 34 and the second housing part 35 (the first housing part 34 herein), and the ECUs 151 and 152 and the signal line 142b which are the signal module components are housed in the other one of the first housing part 34 and the second housing part 35 (the second housing part 35 herein).

In the manner similar to the above embodiment, it is preferable that the battery 153 and the power supply line 142a which are the power supply module components are attached to one of the first covering part 38 and the second covering part 39 (the first covering part 38 herein), and the ECUs 151 and 152 and the signal line 142b which are the signal module components are attached to the other one of the first covering part 38 and the second covering part 39 (the second covering part 39 herein).

The power supply line 142a and the signal line 142b pass through the partition 36, for example, and are lead from the first housing part 34 to the second housing part 35 and vice versa as necessary.

According to this modification example, the battery 153 and the power supply line 142a which are the power supply module components and the ECUs 151 and 152 and the signal line 142b which are the signal module component are partitioned by the partition 36, thus the modification example has an advantage that electromagnetic noise therebetween can be easily shielded.

It is preferable that all of the power supply module components and all of the signal module components are housed in the different housing parts, however, this configuration is not necessary. The reason is that when at least one power supply module component and at least one signal module component are housed in the different housing parts, the electromagnetic noise therebetween can be shielded.

Figure 5:
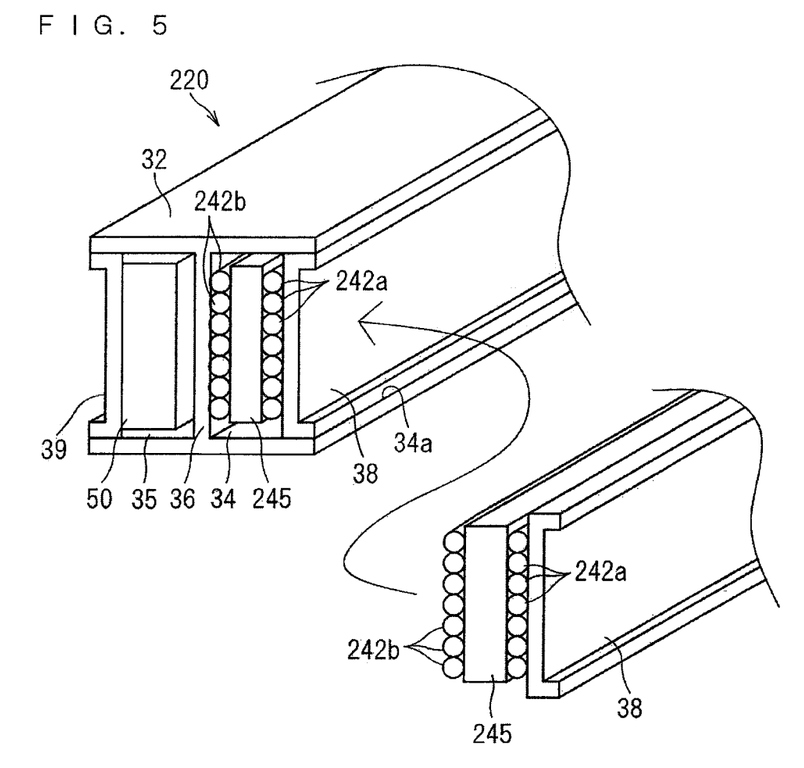
FIG. 5 An explanation diagram illustrating a reinforcement module according to a second modification example.

A reinforcement module 220 according to a second modification example illustrated in FIG. 5 includes power supply lines 242a and 242b as module components. Herein, the reinforcement module 220 includes a plurality of power supply lines 242a and 242b.

Some of the power supply lines 242a are attached to the first covering part 38 while being in contact with the first covering part 38.

The other some of the power supply lines 242b are attached to the first covering part 38 via an elastic member 245.

More specifically, some of the power supply lines 242a are attached to the main surface of the first covering part 38. The elastic member 245 is attached to the power supply lines 242a. The power supply lines 242b are attached to the elastic member 245. The elastic member 245 and the power supply lines 242b can be attached by a double-sided tape and an adhesive agent, for example.

The elastic member 245 is a member having elasticity such as sponge and a rubber. A thickness dimension of the elastic member 245 is set larger than a value obtained by subtracting a dimension of diameters of the power supply lines 242a and 242b from a dimension of distance from the inner surface of the first housing part 34 to the partition 36 in a state where the first covering part 38 is attached to the reinforcement body 32.

When the first covering part 38 is attached to the reinforcement body 32 to close the opening 34a of the first housing part 34, the elastic member 245 presses the power supply line 242b to the inner surface of the first housing part 34, herein, the main surface of the partition 36. Thus, the power supply line 242b comes in contact with the reinforcement body 32, and the heat of the power supply line 242b is easily radiated via the reinforcement body 32.

The heat of the power supply line 242a is easily radiated via the first covering part 38. Thus, in a case where there are many power supply lines 242a and 242b, the heat can be radiated via both the first covering part 38 and the reinforcement body 32.

In the example in the embodiment described above, the reinforcement body 32 includes the two housing parts 34 and 35, however, it may include only one housing part or may also include three or more housing parts.

Figure 6:
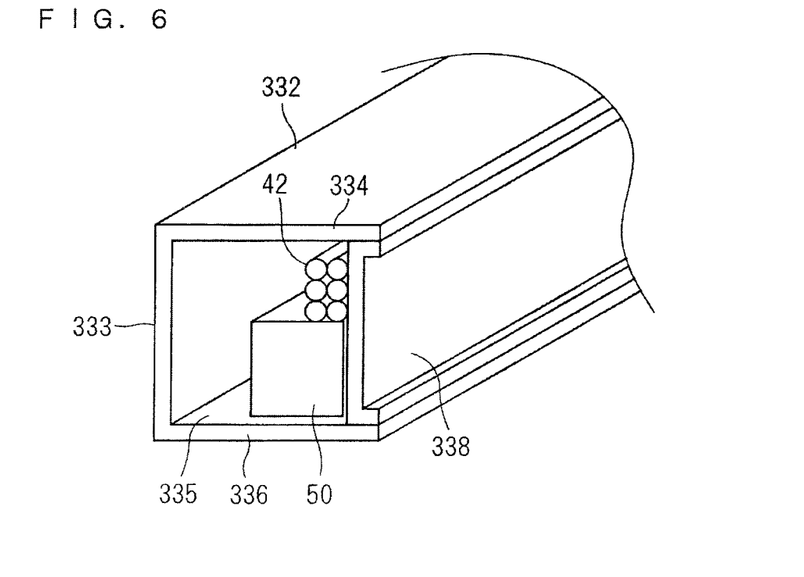
FIG. 6 A schematic perspective view illustrating a reinforcement module according to a third modification example.

In a third modification example illustrated in FIG. 6, a reinforcement body 332 is formed into a shape in which a pair of sidewall parts 334 and 334 each having an elongated plate-like shape are sequentially formed in parallel with each other on both sides of a bottom plate part 333 having an elongated plate-like shape, that is to say, a U-shape in a cross section. A space surrounded by the bottom plate part 333 and the pair of sidewall parts 334 and 334 is a housing part 335. A covering part 338 is attached between tip-side edge parts of the pair of sidewall parts 334 and 334 to close an opening on an opposite side of the bottom plate part 333.

The wire harness 42 which is a wiring component and the electrical component 50 are attached to the covering part 338, thus when the covering part 338 is attached to the reinforcement body 332, the wire harness 42 and the electrical component 50 are housed in the housing part 335.

Each configuration described in the embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 20, 120, 220 reinforcement module
30 reinforcement
32, 332 reinforcement body
34 first housing part
34a opening
35 second housing part
35a opening
36 partition
38 first covering part
39 second covering part
42 wire harness
42a electrical wire
50 electrical component
51, 52, 151, 152 ECU
53, 153 battery
142a power supply line
142b signal line
242a, 242b power supply line
245 elastic member
335 housing part
338 covering part

The invention claimed is:

1. A reinforcement, comprising:
a reinforcement body formed into an elongated shape and having a housing part which is opened toward an outer peripheral side; and
a covering part attached to close an opening of the housing part, wherein
the reinforcement body includes a first housing part and a second housing part opened toward an outer peripheral side in different positions as the housing part, and the first housing part and the second housing part are partitioned in the reinforcement body, and
the reinforcement body includes, as the covering part, a first covering part attached to close an opening of the first housing part and a second covering part attached to close an opening of the second housing part.

2. A reinforcement module, comprising:
the reinforcement according to claim 1; and
a module component which is an electrical component or a wiring component, and housed in the reinforcement while being attached to the covering part.

3. A reinforcement module, comprising:
a reinforcement including:
a reinforcement body formed into an elongated shape and having a housing part which is opened toward an outer peripheral side, and
a covering part attached to close an opening of the housing part; and
a module component which is an electrical component or a wiring component, and housed in the reinforcement while being attached to the covering part, wherein
the reinforcement body includes a first housing part and a second housing part opened toward an outer peripheral side in different positions as the housing part, and the first housing part and the second housing part are partitioned in the reinforcement body,
the reinforcement body includes, as the covering part, a first covering part attached to close an opening of the first housing part and a second covering part attached to close an opening of the second housing part, and
the module component includes a power supply module component housed in one of the first housing part and the second housing part and a signal module component housed in another one of the first housing part and the second housing part.

4. A reinforcement module, comprising:
a reinforcement including:
a reinforcement body formed into an elongated shape and having a housing part which is opened toward an outer peripheral side, and a covering part attached to close an opening of the housing part; and a module component which is an electrical component or a wiring component, and housed in the reinforcement while being attached to the covering part, wherein the reinforcement body includes a first housing part and a second housing part opened toward an outer peripheral side in different positions as the housing part, and the first housing part and the second housing part are partitioned in the reinforcement body, the reinforcement body includes, as the covering part, a first covering part attached to close an opening of the first housing part and a second covering part attached to close an opening of the second housing part, and the module component includes a wiring component housed in one of the first housing part and the second housing part and an electrical component housed in another one of the first housing part and the second housing part.

5. The reinforcement module according to claim 2, comprising a power supply line as the module component, wherein the power supply line is housed in the reinforcement while being in contact with at least one of the reinforcement body and the covering part.

6. A reinforcement module, comprising:

a reinforcement including:

a reinforcement body formed into an elongated shape and having a housing part which is opened toward an outer peripheral side, and a covering part attached to close an opening of the housing part; and a module component which is an electrical component or a wiring component, and housed in the reinforcement while being attached to the covering part, the module component being a power supply line, wherein the power supply line is housed in the reinforcement while being in contact with at least one of the reinforcement body and the covering part, the reinforcement module comprises a plurality of the power supply line, at least some of the power supply lines is fixed to the covering part via an elastic member, and the elastic member presses the at least some of the power supply lines to an inner surface of the housing part in a condition in which the covering part is attached to the opening of the housing part.

* * * * *